United States Patent [19]

Besch

[11] Patent Number: 4,545,477

[45] Date of Patent: * Oct. 8, 1985

[54] CHAIN CONVEYOR

[75] Inventor: Creighton J. Besch, Seattle, Wash.

[73] Assignee: Conveyor Sales & Mfg. Co., Bellevue, Wash.

[ * ] Notice: The portion of the term of this patent subsequent to Nov. 9, 1999 has been disclaimed.

[21] Appl. No.: 506,980

[22] Filed: Jun. 23, 1983

[51] Int. Cl.4 ............................................. B65G 15/60
[52] U.S. Cl. .................................. 198/841; 198/860.1
[58] Field of Search ............... 198/841, 837, 831, 860, 198/721, 727, 729, 838; 474/140

[56] References Cited

U.S. PATENT DOCUMENTS

| | | | |
|---|---|---|---|
| 1,939,862 | 12/1933 | Preble | 198/841 |
| 3,236,363 | 2/1966 | Sutliffe | 198/841 X |
| 3,605,994 | 9/1971 | Parlette | 198/841 X |
| 3,620,355 | 11/1971 | Jones, Jr. | 198/831 |
| 3,706,371 | 12/1972 | Hirota | 198/838 |
| 3,800,938 | 4/1974 | Stone | 198/841 |
| 3,835,982 | 9/1974 | Zappia | 198/841 X |
| 4,358,010 | 8/1981 | Besch | 198/838 |

FOREIGN PATENT DOCUMENTS

| | | | |
|---|---|---|---|
| 0036958 | 10/1981 | European Pat. Off. | 198/837 |
| 2240459 | 3/1973 | Fed. Rep. of Germany | 198/837 |
| 2069442 | 8/1981 | United Kingdom | 198/841 |

Primary Examiner—Joseph E. Valenza
Assistant Examiner—Jonathan D. Holmes
Attorney, Agent, or Firm—Christensen, O'Connor, Johnson & Kindness

[57] ABSTRACT

An improved chain-type conveyor, the load and return stretches of which are supported and guided in a slotted unitary extruded track of synthetic material made up in successive beam-like length sections joined end to end by specially formed coupler fittings and supported intermediate their ends by cross supports with anchor lugs engaging footing flanges on the track sections.

8 Claims, 6 Drawing Figures

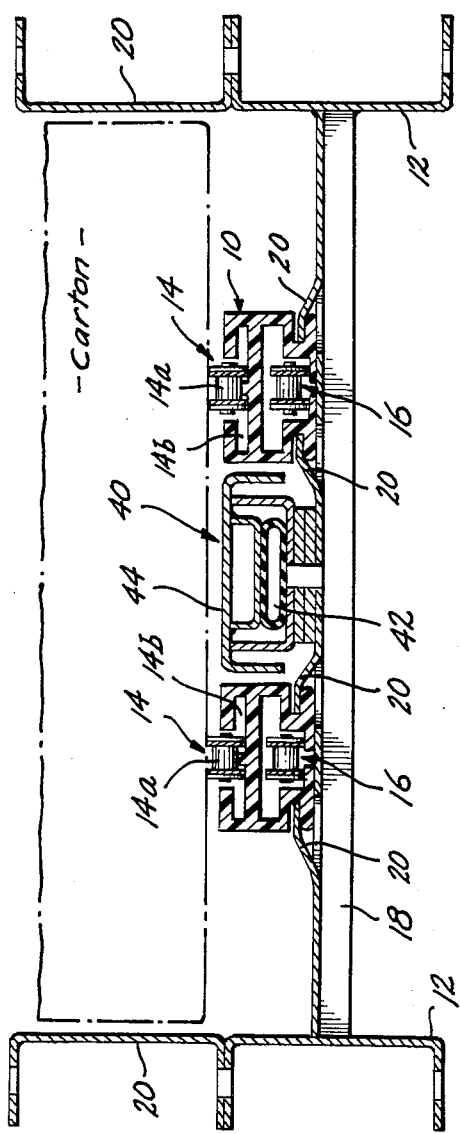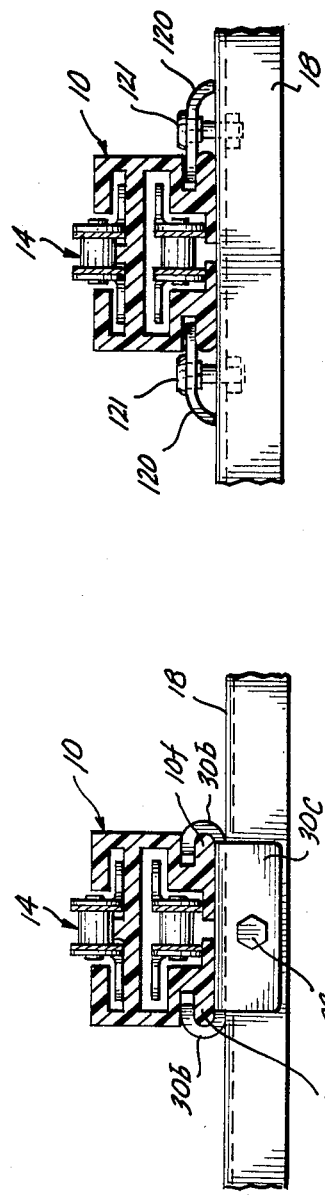

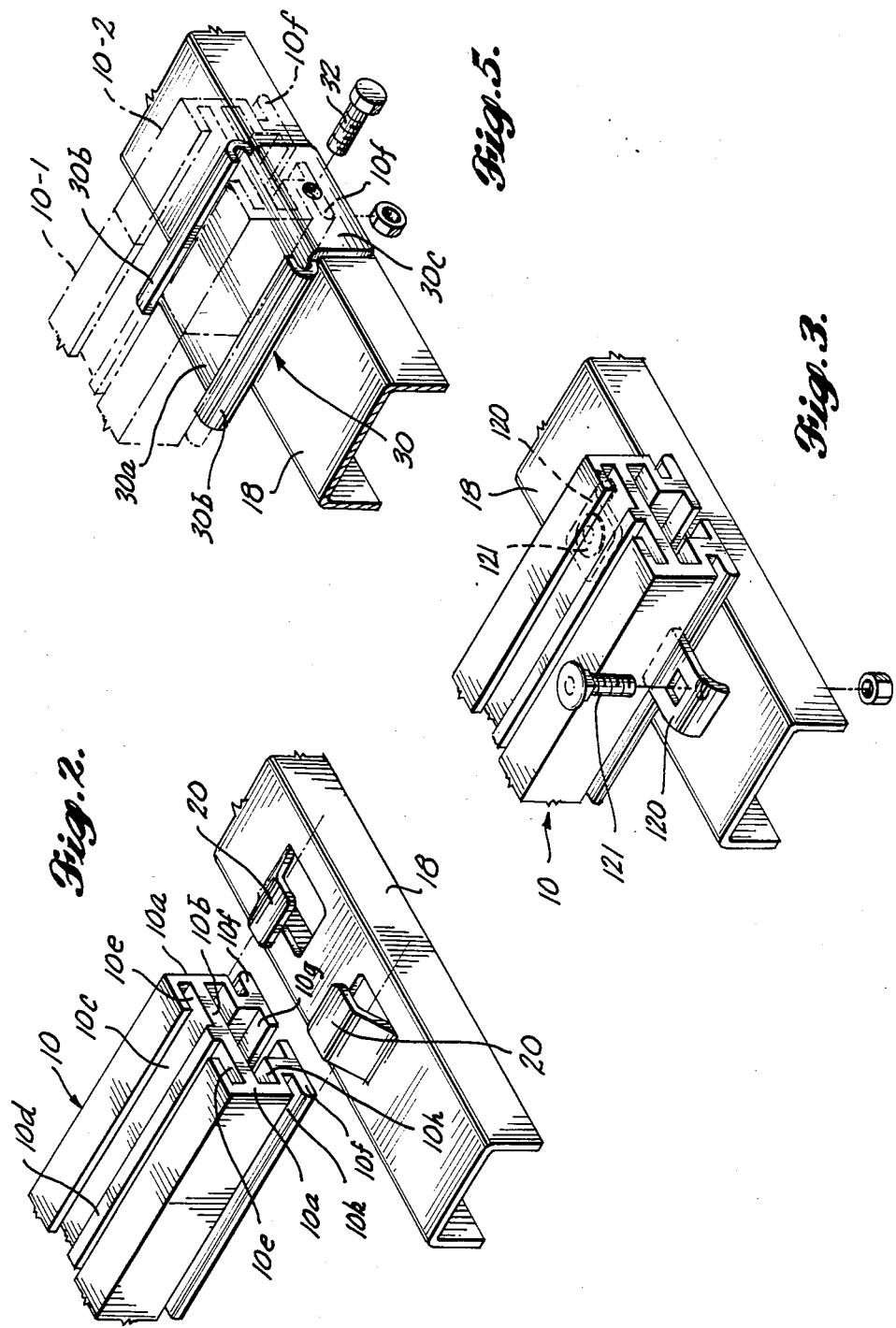

CHAIN CONVEYOR

BACKGROUND OF THE INVENTION

This invention relates to improvements in chain-type conveyor apparatus generally of the type disclosed in U.S. Pat. No. 4,358,010, Creighton Besch. More particularly, the invention is herein illustratively described in its presently preferred form suitable for transporting items such as cartons of goods.

Probably the most extensive uses now being made and those expected in the foreseeable future for chain conveyor apparatus of the type here of interest lay in packing plants, bottling plants, and warehouses wherein cases of canned goods and bottled goods are transported between points. The line conveyors used for such purposes by the hundreds, and sometimes thousands, of lineal feet in a plant should be as low in cost, as compact, as easily installed and, above all, as durable and maintenance-free as possible. The present invention provides improvements achieving these objectives.

SUMMARY OF THE INVENTION

As herein disclosed, the present improvements center around the novel unitized, multifunction, chain support and guide track. This guide track is formed in extruded sections of synthetic material of selected lengths which are uniformly cross sectioned to provide in a unitary extrusion guide channels or slots for both the load-bearing and return stretches of the conveyor chain, respectively, and with the cross sectioning designed for simplified mounting and to enable each track section length to serve as an efficiently cross-sectioned bridging beam for spanning between spaced framework support members using minimum bulk of material.

Preferably, each extrusion-molded track section is of generally rectangular proportions. Its side portions serve effectively as beams interconnected by an intermediate transverse web, with footing flanges at the lower edges of the side portions serving not only as beam reinforcement members but as lateral stiffeners augmenting the web in that regard. Above the web member, the section has an upwardly open slot with lateral side recesses therein to receive the wing-like bearing members of the load-bearing stretch of conveyor chain. The web member has a rib thereon which is engagable by the roller-like central elements of the conveyor chain as in the above-cited prior patent. Between the side portions of the track section and beneath the web thereof is a downwardly open slot with side recesses engagable by the wing-like support elements of the return stretch of conveyor chain.

Successive mutually abutted ends of successive track sections are maintained and supported in coalignment on transverse support beams by metal couplers having a base plate with inwardly flanged upright sides forming lateral retainer slots which slidably receive and retain track section footing flanges. The base plate of the coupler preferably has a depending flange which laps down over and is secured to a side of the framework support member. Intermediate transverse support members have metal upper plates or flanges, each with a pair of lugs struck upwardly therefrom which slidably receive and retain footing flanges of a track section resting upon the support member. These stabilize the track section positionally intermediate its ends.

The design configuration of the extruded track section is such as to permit its formation using practical extrusion methods and tools and a minimum bulk of synthetic material.

These and other features, objects and advantages of the invention will become more fully evident as the description with reference to the accompanying drawings.

BRIEF DESCRIPTION OF DRAWINGS

FIG. 1 is a transverse sectional view of a conveyor run incorporating a spaced pair of individual chain conveyors, these being mounted on a framework between carton guides and with a carton elevator shown positioned intermediate the two conveyor chains. The view illustrates one type of postioning means for holding the track sections intermediate their ends resting on a transverse support beam.

FIG. 2 is a perspective view showing the cross sectional configuration of one track section and the type of mounting and securing means shown in FIG. 1.

FIG. 3 is a perspective view similar to FIG. 2 illustrating a modified means for securing a track section intermediate its ends resting on a transverse support beam.

FIG. 4 is a transverse sectional view illustrating the mounting means shown in FIG. 3 holding a track section with load and return conveyor chain stretches received in the upper and lower guide slots therein.

FIG. 5 is a perspective view illustrating the coupling means by which mutually abutted ends of successive track sections are secured in alignment resting on a transverse support beam.

FIG. 6 is a transverse sectional view corresponding to FIG. 4 and illustrating the coupling means of FIG. 5.

DETAILED DESCRIPTION OF THE INVENTION

In FIGS. 1 and 2, track sections 10 are of extruded synthetic material of unitary form and of selected length abutted end to end in coalignment supported by transverse support beams 18 of a suitable framework not detailed in the drawings nor of particular relevance here. Channel-shaped guides and supports 12 run the length of the load-bearing and return stretches of conveyor chain 14 and 16 respectively. Transverse support beams 18 extend between the side members 12 at spaced intervals along the length of conveyor run. Preferably, the support beams 18 comprise sheet metal channels with downwardly directed flanges. Additional channel-shaped guide members 20 with outwardly directed flanges are mounted on top of members 20 to increase the height of the side guides for cartons to be conveyed.

As seen best in FIG. 2, track sections 10 are of special extruded unitary cross-sectional configuration. The synthetic material used may vary, but it is found in practice that a high molecular weight polyethylene polymer is both strong and durable as a low-friction guide to support and guide the load and return stretches of conveyor chain. Each track section comprises opposite side portions 10a maintained in spaced parallel relationship by a transverse web portion 10b such that each side section serves cooperatively with the other to make up a composite unitary spanner beam in the gaps where it extends between transverse framework support beams 18. The track section 10 includes an upwardly open slot 10c with a central rib 10d at the bottom thereof (i.e., formed on web 10b) upon which the roller-like elements 14a run, and which also serves to position the load-bearing conveyor chain stretch transversely of the track section, as more fully described in the above-said U.S. Pat. No. 4,358,010. Also, as described in said patent, the conveyor chain has laterally extending wings 14b which share the load with roller elements 14a and which serve to stabilize the chain portion. Upwardly open slot 10c has lateral recesses 10e, designed to receive and guide the projecting wing elements during longitudinal movement of the conveyor chain.

The track section side portions 10a extending downwardly from the ends of connecting web 10b terminate in longitudinally extending footing flanges 10f with substantial coplanar bottom faces adapted to rest on a common support such as a transverse support beam 18. These downwardly projecting leg flanges project laterally in both directions from the leg portions of the composite track section and are spaced apart for convenience in extrusion molding. Between the side portions a guide slot 10g is formed which accommodates the return conveyor chain stretch 16 as shown. This downwardly open guide slot includes laterally extending side recesses or slots 10h which slidably receive, support and guide the wing elements of the conveyor chain return stretch 16.

Adjacent and immediately above the outwardly projecting legs of the footing flanges 10f are slots 10k opening outwardly along opposite faces of the track section side portions, and it is these slots which are used in the improved method of mounting the track sections. As illustrated in FIGS. 1 and 2, this improved means includes striking up from the web of the transverse support beam 18 two spaced retainer tabs or lugs 20 which are spaced apart and are elevated above the face of the transverse beam 18 sufficiently to slidably receive yet snugly retain the outwardly projecting portions of the footing flanges 10f. The sliding engagement simplifies installation of the system, the track section being simply slid into place endwise between sets of lugs 20.

At support locations where it is not practical or possible to use the stationary positioning tabs 20 formed from the metal of the support beam web, an alternative method as depicted in FIG. 3 wherein comparable lugs 120 are placed over the footing flange portions 10f and are bolted into position using carriage bolts 121 which pass through apertures in the web of beam 18 and tightened by means of nuts threaded onto the bolts from the other side of the beam web. This is as shown in FIGS. 3 and 4.

In the positioning of connected track sections 10 in abutted coalignment, special provisions are made for coupling the ends together, mutually overlapping a common support beam 18 as shown in FIGS. 5 and 6. In FIG. 5, for example, track sections 10-1 and 10-2 are shown in dotted lines mutually abutted and overlapping the support beam 18 with the overlapped lapping portions resting upon the base plate 30a of track section coupler 30. Preferably formed of sheet metal, the coupler 30 has side flanges 30b which turn upwardly and inwardly so as to lap over the footing flanges 10f of the abutted track sections 10-1 and 10-2 as shown. For this purpose, flanges 30b have inwardly projecting edge portions slidably and snugly received in the slots 10k of such track sections. The coupler base plate 30a has an end portion 30c turned downwardly to lap over the flange of the support beam 18. It is either welded to such flange or secured in place by a mounting bolt 32 as shown.

In the installation shown cross-sectionally in FIG. 1, loaded cartons are supported by two parallel bearing stretches of conveyor chains spaced apart a suitable distance and between which, at one or more stations along the length of the conveyor run, may be mounted one or more elevators 14. Each elevator 40 includes a pneumatically inflatable tube 42. Normally deflated, the tube 40 maintains the carton bearing surface 44 of the elevator below the plane of the load-bearing chains 14a. Inflation of the tube 40 raises the bearing surface 44 to lift the carton or cartons from the conveyor chains as desired. Such an elevator mechanism and its purpose is disclosed in said U.S. Pat. No. 4,358,010.

It will be appreciated that the foregoing description and accompanying illustration of the preferred embodiment are directed to the presently preferred form of the invention, but that design variations are possible within the scope of the inventive concepts. Accordingly, it is intended that the appended claims be interpreted in the spirit of protectively covering not only the apparatus illustrated but also equivalents thereof.

The embodiments of the invention in which an exclusive property privilege is claimed are defined as follows:

1. In a chain conveyor for loaded cartons and the like, wherein an endless conveyor chain has central roller-like bearing elements and laterally projecting wing-like bearing elements and is guided in a circuitous path including a return stretch immediately underlying a load-bearing stretch, the improvement comprising a multisection chain support and guide track, individual sections of which are adapted to be mounted in alignment on transverse members of a conveyor support framework spaced apart longitudinally of the conveyor run, said track sections comprising extruded lengths of synthetic material, each having an upwardly open longitudinal chain support and guide slot with a central bottom rib adapted to be engaged as a bearing track by the central chain roller-like bearing elements and adjoined by lateral side slots adapted to slidably receive the associated chain wing-like bearing elements, said track section having opposite side portions which comprise downwardly extending leg flanges which continue the length of the track section and terminate at their lower edges in transversely extending footing flanges with bottom faces lying substantially in a common plane, and with a longitudinally extending gap formed between said footing flanges, ;p1 said track section having a downwardly open slot formed between said leg flanges with laterally extending slots in the opposite sides thereof for receiving the wing-like bearing elements of the chain return stretch accommodated in said downwardly open slot.

2. The conveyor defined in claim 1, wherein the individual track sections are of generally rectangular cross-sectional proportions and wherein the transversely extending footing flanges extend both laterally outward and laterally inward from the leg flanges.

3. The conveyor defined in claim 1, wherein the footing flanges of the individual track sections rest upon a succession of longitudinally spaced transverse framework support members, including a support member overlapped by mutually abutted ends of two successive track sections, and a supportive coupling for such mutually abutted ends secured upon the support member, and having a support plate resting upon said support member and, in turn, upon which the track section footing flanges rest, and further having upright sides with inwardly turned edges to form lateral side recesses which retentively engage the respective footing flanges so as to maintain such track sections in mutual alignment.

4. The conveyor defined in claim 3, wherein the support plate has at least one downturned end overlapping and secured to the support member.

5. The conveyor defined in claims 3 or 4, wherein the support framework includes at least one transverse support member intermediate the ends of a track section, said support member having a top plate upon which the footing flanges of the track sections rest, said top plate having upwardly struck lugs overlapping and in sliding retentive engagement with said footing flanges entered by longitudinal sliding insertion of the track section footing flanges therein.

6. In a chain conveyor for loaded cartons and the like, wherein an endless conveyor chain has central roller-like bearing elements and laterally projecting wing-like bearing elements guided in a circuitous path including a return stretch immediately underlying a load-bearing stretch, a track section of extruded synthetic material in a unitary form adapted for guiding a portion of the load-bearing stretch and an immediately underlying portion of return stretch of conveyor chain, said track section comprising transversely spaced upright side portions interconnected by a substantially horizontal web portion at an intermediate height level relative to said side portions, ;p1 the top of said unitary track section having an upwardly open longitudinally extending chain support and guide slot with a central bottom rib on top of said web and with inwardly opening lateral side recesses above said web for engagement respectively by said roller-like bearing elements and said laterally projecting wing-like bearing elements, respectively, said side portions terminating at lower edges with longitudinally extending footing flanges projecting laterally therefrom and forming outwardly open lateral side recesses engagable by securing elements on conveyor framework support members, the bottom of said unitary track section having a downwardly open slot formed between said side portions and including inwardly open lateral recesses adapted to slidably receive and guide the wing-like bearing elements of the chain return stretch immediately beneath said web.

7. The track section defined in claim 6, wherein the footing flanges project laterally both inwardly and outwardly from the respective side portions.

8. In a chain conveyor for loaded cartons and the like, wherein an endless conveyor chain has central roller-like bearing elements and laterally projecting wing-like bearing elements guided in a circuitous path including a return stretch immediately underlying a load-bearing stretch, a unitary chain guidance track means for both the said chain load-bearing stretch and chain return stretch, said track means comprising at least one unitary extruded length of synthetic material having opposite side portions and having an upwardly open guide slot at the top formed to receive and supportively guide the load-bearing conveyor chain stretch, a downwardly open guide slot at the bottom thereof formed to receive and supportively guide the return conveyor chain stretch, and a web portion extending lengthwise of the track means and interconnecting the said portions between said guide slots, said web portion having a central rib thereon engagable by the roller-like bearing element of the load-bearing stretch.

* * * * *

UNITED STATES PATENT AND TRADEMARK OFFICE
CERTIFICATE OF CORRECTION

PATENT NO. : 4,545,477

DATED : October 8, 1985

INVENTOR(S) : Creighton J. Besch

It is certified that error appears in the above-identified patent and that said Letters Patent is hereby corrected as shown below:

Column 2, line 14, "postioning" should read -- positioning --.

Column 2, line 45, "chain" should read -- chains --.

Column 2, line 47, before "conveyor" insert -- the --.

Column 4, line 6, "14" should read -- 40 --.

Column 4, lines 8 and 10, "40", each occurrence, should read -- 42 --.

Column 4, line 23, before "privilege" insert -- or --.

Column 4, line 51, delete ";pl" before "said" (should be a paragraph).

Column 5, line 32, delete ";pl" before "the" (should be a paragraph).

Signed and Sealed this

Fourth Day of February 1986

[SEAL]

Attest:

DONALD J. QUIGG

Attesting Officer

Commissioner of Patents and Trademarks